United States Patent
Rajvanshi et al.

(10) Patent No.: US 12,062,221 B2
(45) Date of Patent: Aug. 13, 2024

(54) GENERATING OBJECT IMAGES WITH DIFFERENT LIGHTING CONDITIONS

(71) Applicant: ADOBE INC., San Jose, CA (US)

(72) Inventors: Tushar Rajvanshi, Noida (IN); Sourabh Gupta, Noida (IN); Ajay Bedi, Hamirpur (IN)

(73) Assignee: ADOBE INC., San Jose, CA (US)

( * ) Notice: Subject to any disclaimer, the term of this patent is extended or adjusted under 35 U.S.C. 154(b) by 169 days.

(21) Appl. No.: 17/587,840

(22) Filed: Jan. 28, 2022

(65) Prior Publication Data
US 2023/0281952 A1   Sep. 7, 2023

(51) Int. Cl.
- G06V 10/60 (2022.01)
- G06V 10/56 (2022.01)
- G06V 10/778 (2022.01)
- G06V 20/64 (2022.01)
- G06V 20/70 (2022.01)

(52) U.S. Cl.
CPC ............. *G06V 10/60* (2022.01); *G06V 10/56* (2022.01); *G06V 10/778* (2022.01); *G06V 20/64* (2022.01); *G06V 20/70* (2022.01)

(58) Field of Classification Search
CPC ...... G06V 10/60; G06V 10/56; G06V 10/778; G06V 20/64; G06V 20/70
See application file for complete search history.

(56) References Cited

PUBLICATIONS

"Natalia Neverova et al., Lighting Estimation in Indoor Environments from Low-Quality Images, 2012, Part of the Lecture Notes in Computer Science book series LNIP, vol. 7584, Computer Vision—ECCV 2012, Workshops and Demonstrations pp. 380-389" (Year: 2012).*

"Le Kang et al., Convolutional Neural Networks for No-Reference Image Quality Assessment, 2014, Proceedings of the IEEE Conference on Computer Vision and Pattern Recognition, pp. 1733-1740" (Year: 2014).*

"Triphena Delight D. et al., Deep Learning based Object Detection using Mask RCNN, Aug. 2021, 6th International Conference on Communication and Electronics Systems Coimbatre, India" (Year: 2021).*

(Continued)

*Primary Examiner* — Andrae S Allison
*Assistant Examiner* — Phuong Hau Cai
(74) *Attorney, Agent, or Firm* — Shook, Hardy & Bacon L.L.P.

(57) ABSTRACT

An image generation system generates images of objects under different lighting conditions. An image of an object and lighting conditions for an output image are received. The lighting conditions may specify, for instance, a location and/or color of one or more light sources. The image of the object is decomposed into a shading component and a reflectance component. A machine learning model takes the reflectance component and specified lighting conditions as input, and generates an output image of the object under the specified lighting conditions. In some configurations, the machine learning model may be trained on images of objects labeled with object classes, and the output image may be generated by also providing an object class of the object in the image as input to the machine learning model.

20 Claims, 9 Drawing Sheets

(5 of 9 Drawing Sheet(s) Filed in Color)

(56) References Cited

PUBLICATIONS

"Sung-Hsien Hsieh et al., Weighted Map for Reflectance and Shading Separation Using a Single Image, 2009, Part of the Lecture Notes in Computer Science book series vol. 5996, Asian Conference on Computer Vision, pp. 85-95" (Year: 2009).*

"Marshall Tappen et al., Recovering Intrinsic Images from a Single Image, 2002, Part of Advances in Neural Information Processing Systems 15" (Year: 2002).*

"Sebastian B. Knorr et al., Real-time Illumination Estimation from Faces for Coherent Rendering, Sep. 2014, 2014 IEEE International Symposium on Mixed and Augmented Reality, Munich, Germany" (Year: 2014).*

"Ravi Ramamoorthi et al., A Signal-Processing Framework for Inverse Rendering, Aug. 2001 SIGGRAPH 01: Proceedings of the 28th Annual Conference on Computer Graphics and Interactive Techniques, pp. 117-128" (Year: 2001).*

"Kevin Karsch et al., Rendering Synthetic Objects into Legacy Photographs, 2011, ACM Transactions on Graphics, vol. 30, Issue 6, pp. 1-12" (Year: 2011).*

\* cited by examiner

GENERATING OBJECT IMAGES WITH DIFFERENT LIGHTING CONDITIONS

BACKGROUND

The past few decades have seen a paradigm shift away from "brick and mortar" stores toward online shopping at e-commerce sites. Virtually every company that sells products has an online presence via a website that allows customers to view and purchase products being offered. While many websites attempt to provide an experience that is as close as possible to a physical interaction with a product (such as that available in a brick and mortar store), there are inherent limitations to providing such experiences on websites. One particular limitation involves assessing the appearance of a product. Currently, websites provide one or more images of a product to allow users to view the product and assess its appearance. In some cases, a website may provide different images of a product or a 360-degree interactive experience that allows users to view the product from different angles. However, other aspects are more difficult to capture on a website. One aspect in particular is the appearance of products under different lighting conditions. Images of products on websites are typically captured under particular lighting conditions. This fails to present the products under other lighting conditions although products often appear different (sometimes drastically different) in various lighting conditions.

SUMMARY

Embodiments of the present invention relate to, among other things, an image generation system that generates images of objects under different lighting conditions. Given an image of an object, the image is decomposed into a shading component and a reflectance component. Lighting conditions for an output image are received. The lighting conditions may specify, for instance, a location and/or color of one or more light sources. A machine learning model trained to generate images takes the reflectance component and specified lighting conditions as input, and generates an output image of the object under the specified lighting conditions. In some configurations, the machine learning model may be trained on images of objects labeled with object classes, and the output image may be generated by also providing an object class of the object in the image as input to the machine learning model This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described in detail below with reference to the attached drawing figures, wherein.

DETAILED DESCRIPTION

Definitions

Various terms are used throughout this description. Definitions of some terms are included below to provide a clearer understanding of the ideas disclosed herein.

As used herein, an "input image" refers to an image with at least one object that is received for processing to generate an "output image" of the object under a specified lighting condition. For example, an input image of a couch may be provided as input. In accordance with the technology described herein, the input image is processed to generate an output image of the couch under a particular lighting condition.

The term "subimage" is used herein to refer to a portion of an image. For instance, an input image may be processed in accordance with aspects of the technology described herein to identify an object of the image, and a subimage may be generated that comprises the portion of the image with the object. In some configurations, the subimage may comprise an area corresponding with a boundary mask on the image.

As used herein, "decomposition" of an image comprises generating a shading component and a reflectance component from the image. A "shading component" of an image captures the interaction of surfaces in a scene in the image and illumination of the scene. A "reflectance component" of an image captures how each point in the scene of the image reflects light.

As used herein, a "lighting condition" is a property of a light source used to illuminate an object in an image. By way of example only and not limitation, lighting conditions may include a location of a light source relative to an object in an image. As another example, lighting conditions may include a color of a light source. For instance, a light source may be neutral, white, or yellow light.

Overview

Current product websites typically provide one or more images of a product with particular lighting conditions under which the images were captured. However, some products may have drastically different appearances under different lighting conditions. As such, users are not able to fully assess the appearance of the products. As an example to illustrate this problem, a dress may appear differently during the day than at night. One user may wish to wear the dress for a daytime event, and the images on the website may give a sufficiently accurate depiction of the dress during the day. However, another user may wish to wear the dress for a nighttime event, and the images included on the website do not accurately reflect the appearance of the dress at night. As another example, images of a sofa provided on a website may have been captured under studio lighting that differs from the lighting in a user's living room. As such, the images do not accurately reflect how the sofa will look in the user's living room.

One way to address this problem is to capture images of products under different lighting conditions. However, this is not a practical solution for many websites given the number of products available. Another approach is to employ an image editing application (such as the Photoshop application) to edit images of a product to create images under different lighting conditions. However, this is a tedious and time-consuming process that requires someone to be experienced with the image editing application. As such, it is similarly not a practical solution given the number of products available on many websites.

Embodiments of the present invention address these shortcomings by providing an image generation system that, among other things, facilitates the generation of images of objects (such as products) under different lighting conditions. At a high level, an image of an object is decomposed into shading and reflectance components, and an output image of the object under different lighting conditions is generated using the reflectance component with shading based on specified lighting conditions.

In accordance with some aspects of the technology described herein, an input image of an object may be preprocessed to identify the object and determine an object class for the object. In some configurations, a subimage of the image containing the object is generated, for instance, by generating a mask corresponding with the object.

After any preprocessing, an image of the object (e.g., the input image or subimage) is decomposed into a shading component and a reflectance component. The shading component captures the interaction of surfaces in a scene in the image and the illumination. The reflectance component captures how each point reflects light. Image decomposition may include determining image derivatives and classifying each image derivative as caused by shading or reflectance. The shading component may be generated by inverting the image derivatives classified as shading. The reflectance component may be generated by inverting the image derivations classified as reflectance.

Given specified lighting conditions, an output image of the object under the lighting conditions is generated. The lighting conditions may specify, for instance, the location and/or color of one or more light sources. The output image may be generated using a machine learning model taking the reflectance component and the specified lighting conditions as input. In some configurations, the machine learning model may also take the class of the object as input. The machine learning model generates an output image with the object under the specified lighting conditions.

The technology described herein provides a number of advantages over existing technology. For instance, the image generation system described herein is capable of automatically generating output images of objects under various lighting conditions by simply specifying the lighting conditions for the output images. By decomposing an image of an object into shading and reflectance components, and using the reflectance component with specified lighting conditions to generate an output image, the image generation system is capable of taking into account the lighting conditions of the original image to generate an output image that accurately reflects the object under the new lighting conditions.

Example System for Generating Object Images with Different Lighting Conditions

Figure 1:
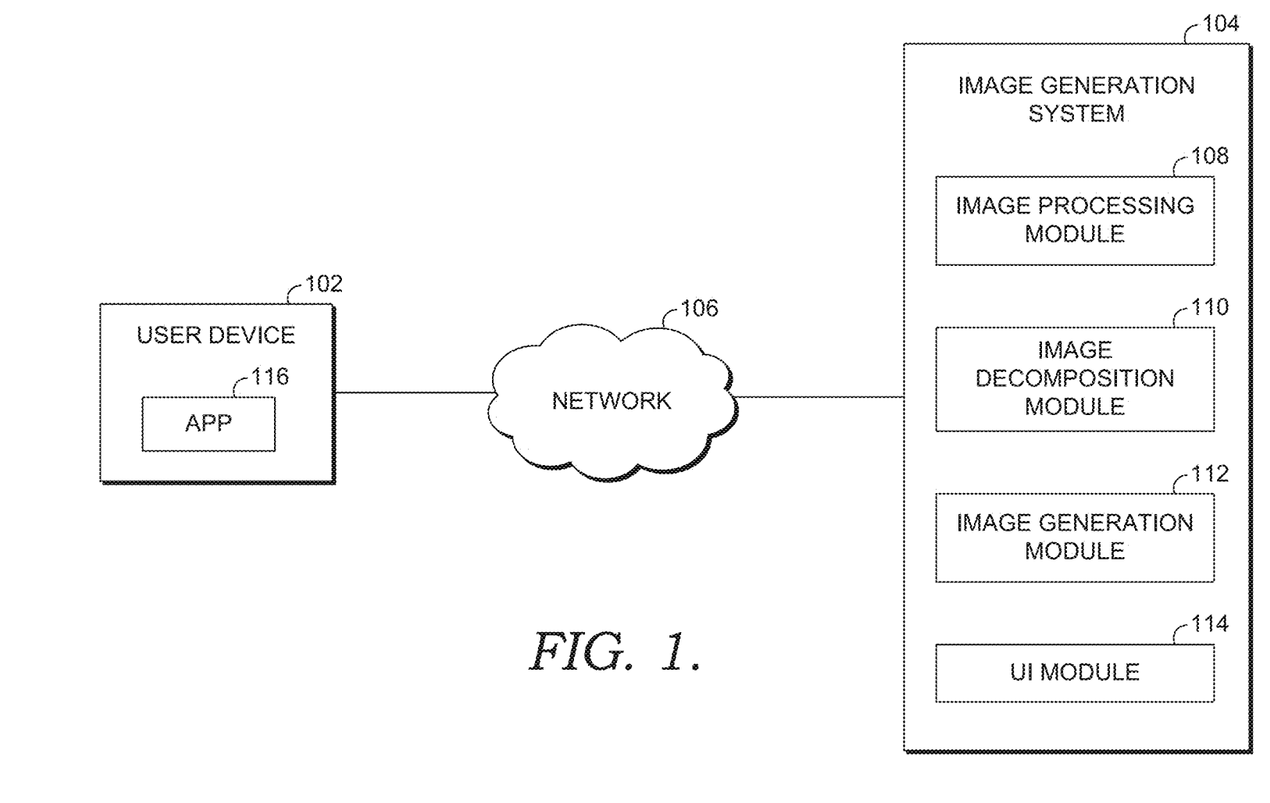
FIG. 1 is a block diagram illustrating an exemplary system in accordance with some implementations of the present disclosure.

With reference now to the drawings, FIG. 1 is a block diagram illustrating an exemplary system 100 for generating images of objects under different lighting conditions in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and an image generation system 104. Each of the user device 102 and image generation system 104 shown in FIG. 1 can comprise one or more computer devices, such as the computing device 700 of FIG. 7, discussed below. As shown in FIG. 1, the user device 102 and image generation system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the image generation system 104 could be provided by multiple devices collectively providing the functionality of the image generation system 104 as described herein. Additionally, other components not shown may also be included within the network environment.

At a high level, the image generation system 104 generates images of objects under different lighting conditions given input images of the objects. As shown in FIG. 1, the image generation system 104 includes an image processing module 108, image decomposition module 110, image generation module 112, and user interface module 114. These components may be in addition to other components that provide further additional functions beyond the features described herein.

The image generation system 104 can be implemented using one or more devices, one or more platforms with corresponding application programming interfaces, cloud infrastructure, and the like. While the image generation system 104 is shown separate from the user device 102 in the configuration of FIG. 1, it should be understood that in other configurations, some or all of the functions of the image generation system 104 can be provided on the user device 102.

Given an input image including an object, the image processing module 108 performs any number of preprocessing steps on the input image. For instance, the image processing module 108 may analyze the image to identify the object, classify the object, and/or provide a subimage comprising a portion of the image containing the object.

In some instances, the image may contain multiple objects and each object can be identified and a subimage provided for each object. Different objects react to various lighting conditions in a different way. For instance, the texture of a sofa may look different in the morning sun light as compared to a glossy vase. Accordingly, identifying and processing an object separate from other objects in the input image and/or a background of the input image can provide for improved image generation under different lighting conditions.

The image processing module 108 can identify an object in an input image using any of a number of object identification techniques. In some configurations, the image processing module 108 employs an algorithm that provides fast boundary detection and is scalable to process new classes of objects added to the system. Such an algorithm may be efficient by not necessarily providing a perfect boundary extraction as blending light doesn't require the subimage to be very accurate across object edges. Additionally, the algorithm may be scalable to consider objects of new classes that are subsequently added to the system.

By way of example only and not limitation, the image processing module 108 performs object identification in some configurations using a Faster-RCNN (ResNet-101) model pre-trained on an image dataset, such as the OpenImages dataset. Each image in the image dataset may include a label identifying a class for the object in the image. Once the model has been trained, an image may be provided to the model as input, and the model may generate a bounding box around an object in the image, a class for the object, and a confidence score indicating a confidence in the class identified for the object. If multiple objects are identified in an image, a bounding box, class, and confidence score may be generated for each object.

The image processing module 108 may further generate a boundary mask for an object in an input image to provide a subimage comprising the object. In the case in which an input image contains multiple objects, a boundary mask may be generated for each object. For instance, a list of objects and their boundary boxes may be provided to an algorithm that outputs a mask for each object. The algorithm may perform a deep cut-out to segment a foreground object in each bounding box. By way of example only and not limitation, this may comprise a machine learning model, such as a customized GoogLeNet model trained with one or more datasets (e.g., COCO, THUS1000, DUTOmron, or other data). This technique generates a boundary mask efficiently without compromising on the accuracy.

Input images provided to the image generation system 104 may have been originally captured under various lighting conditions. These lighting conditions for the input images can interfere while generating images of objects with different lighting conditions. As such, the image generation system 104 compensates for the original lighting conditions of the input images when generating object images under different light conditions. To do so, the image generation system 104 includes a decomposition module 110 that decomposes an image into a reflectance component and shading component. The image processed by the decomposition module 110 may comprise, for instance, an input image provided to the image generation system 104 or a subimage generated from an input image by the image processing module 108.

Every image is the product of the characteristics of a scene. Two of the characteristics of the scene are its shading and reflectance. The shading of a scene is the interaction of the surfaces in the scene and the illumination. The reflectance of the scene describes how each point reflects light. The ability to find the reflectance of each point in the scene and how it is shaded assists in interpreting an image. The image decomposition module 110 may determine the shading and reflectance of each point in a scene by decomposing an input image into two components, one containing the shading of each point in the scene and another containing the reflectance of each point.

The image decomposition module 110 may decompose an image into a reflectance component and shading component in a number of different manners in accordance with different aspects of the technology described herein. In some configurations, the image decomposition module 110 may employ an algorithm that decomposes an image into shading and reflectance components by classifying each image derivative as being caused by a shading or a reflectance change. An image, I(x, y), can be expressed as the product of a shading component, S(x, y), and a reflectance component, R(x, y). When surfaces are diffuse, any changes in a color image due to shading should affect all three color channels proportionally. Given two adjacent pixels in the image having values $c_1$ and $c_2$, where $c_1$ and $c_2$ are RGB triplets, if the change between the two pixels is caused by shading, then only the intensity of the color changes and $c_1 = c_2 * \alpha$ for some scalar $\alpha$.

The process to determine the shading component and the reflectance component may include computing image derivatives in X and Y directions for points in the image. Each derivative is classified as caused by shading or reflectance. Classification into shading or reflectance may be determined using color information. In particular, changes due to shading affect R, G and B channels proportionally (i.e., $c_1 = c_2 * \alpha$). Alternatively, changes due to reflectance do not affect R, G, and B channels proportionally (i.e., $c_1 != c_2 * \alpha$). For non-conclusive areas, evidence can be propagated from conclusive areas to ambiguous ones using Markov Random Field. In this method, it is assumed that nodes along the same contour fall into same section either shading or reflectance.

The shading component is determined by inverting the image derivatives classified as shading. If $f_x$ and $f_y$ are the filters used to compute the →−x and →−y derivatives and $F_x$ and $F_y$ are the estimated derivatives of the shading component, then the shading component, S(x, y) can be determined as follows:

$$S(x,y) = g * [(f_x(-x,-y) * F_x) + (f_y(-x,-y) * F_y)] \quad (2)$$

where * is the convolution operation, f(−x, −y) is a reversed copy of f(x, y), and g is the solution of:

$$g * [(f_x(-x,-y) * f_x(x,y)) + (f_y(-x,-y) * f_x(x,y))] = \delta$$

The reflectance component is determined in the same way by similarly inverting the image derivatives classified as reflectance.

The image generation module 112 uses the reflectance component from the image decomposition module 110 to generate an output image with an object in different lighting conditions. In some configurations, the image generations module 112 employs a machine learning model that takes as input the reflectance component and lighting conditions to generate an output image under the lighting conditions. The lighting conditions may comprise a location of a light source and/or a color of a light source.

By way of example only and not limitation, the machine learning model used by the image generation module 112 may comprise a neural network. For instance, the model may comprise a super-resolution convolution neural network (SRCNN). SRCNN is a three-layer CNN with functions that include patch extraction, nonlinear mapping, and reconstruction and that is optimized using mean square error (MSE) as a loss function. The model may also use dilated (Atreus) convolutions as this is effective in generating smooth transitions. The model may be trained using an image dataset. For instance, the JackRabbot and AStar 3D datasets could be used. These datasets contain labeled data with variations in different day times. The datasets also contain lighting source information. In some instances, the model may also be trained for different object classes to prevent mixing of different object responses to various lighting conditions.

To generate an output image, the machine learning model is provided as input the reflectance component (e.g., R(x, y) determined by the image decomposition module 110) and a shading component based on lighting conditions for the output image. As noted above, the lighting conditions may specify, for instance, a location of a light source and/or a color of a light source. In instances in which the machine learning model is trained for different object classes, the class of the object in the image (e.g., as determined by the image processing component 108) is also provided as input to the machine learning model.

In some configurations, the image generation system 104 may be configured to generate images based on predetermined or default lighting conditions. For instance, the image generation system 104 may be configured to generate images based on a default location of a light source and/or one or more default colors for the light source (e.g., neutral, yellow, or white light).

In some configurations, a user may specify aspects of the lighting conditions. For instance, a user may specific a location of a light source and/or a color of the light source. In some cases, the user selecting lighting conditions for generating output images may be a seller of a product. In such cases, the seller may select different lighting conditions, and the image generation system 104 generates output images of a product under each of those lighting conditions. The output images may be saved and made available to customers via a website. For instance, a customer may visit a webpage for a product that provides options to allow the customer to view the product under the lighting conditions specified by the seller.

In other cases, the user selecting lighting conditions for generating output images may be a customer. For instance, a webpage for a product may provide user interface elements that allow a customer to specify certain lighting conditions, such as a location of a light source and/or a color of a light source. Based on lighting conditions specified by the customer, the image generation system 104 may generate an output image that presents the product under those lighting conditions to the customer.

The user interface (UI) module 114 provides a user interface to user devices, such as the user device 102, for interacting with the image generation system 104. For instance, the UI module 114 can provide user interfaces for receiving an input image for processing. Additionally, the UI module 114 can provide user interfaces for receiving input regarding lighting conditions. For instance the user interfaces may allow a user to specify a location of a light source and/or a color of a light source. Further the UI module 114 may provide output comprising an output image of an object under specific lighting conditions.

The user device 102 can be any type of computing device, such as, for instance, a personal computer (PC), tablet computer, desktop computer, mobile device, or any other suitable device having one or more processors. As shown in FIG. 1, the user device 102 includes an application 116 for interacting with the image generation system 104. The application 116 can be, for instance, a web browser or a dedicated application for interacting with the image generation system 104. For instance, the application 116 can present user interfaces provided by the UI module 104, allowing a user to provide inputs, such as an input image and/or lighting conditions, and receive output, such as a generated image with an object under particular lighting conditions.

Figure 2A:
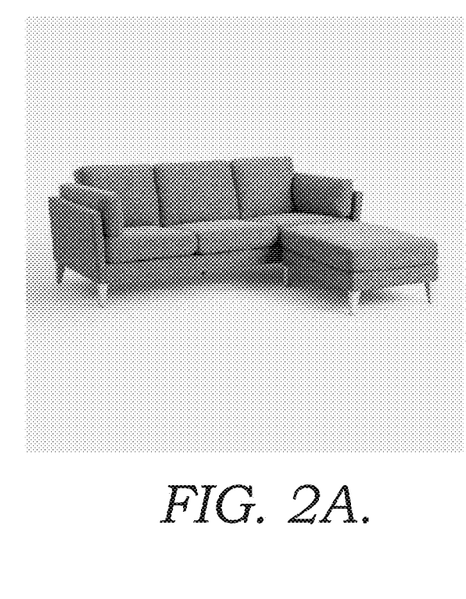
FIGS. 2A-2F provide screenshots showing output images of a dress under different lighting conditions generated using an input image of the dress in accordance with some implementations of the present disclosure.
Figure 2B:
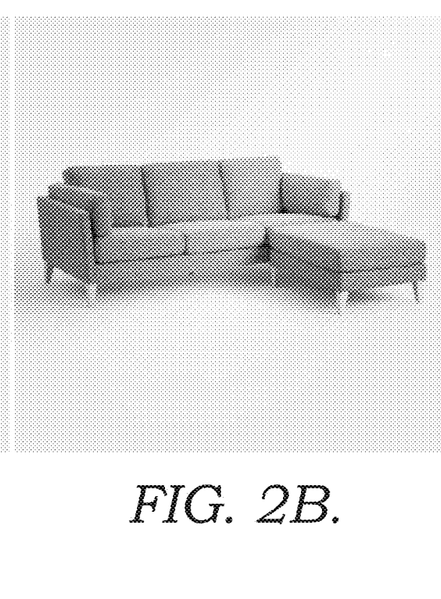
Figure 2C:
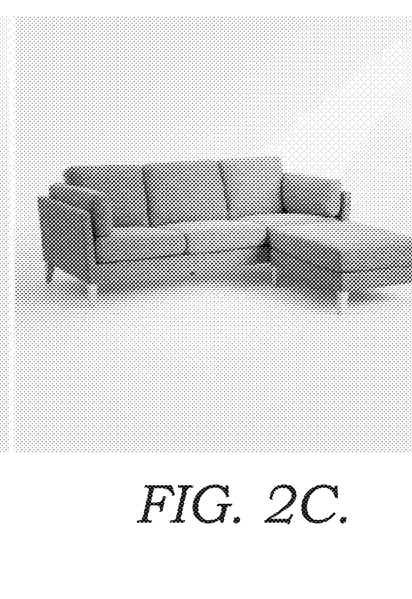
Figure 2D:
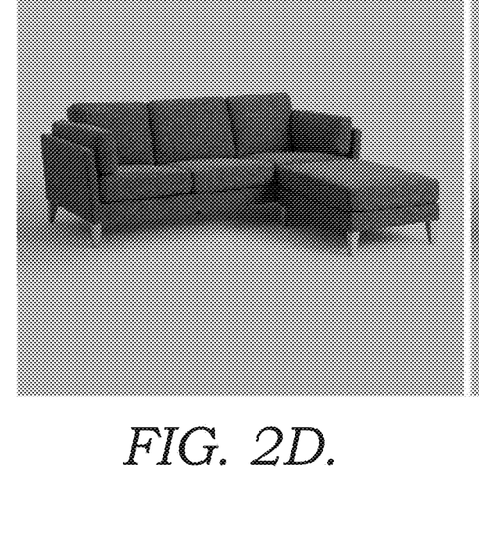
Figure 2E:
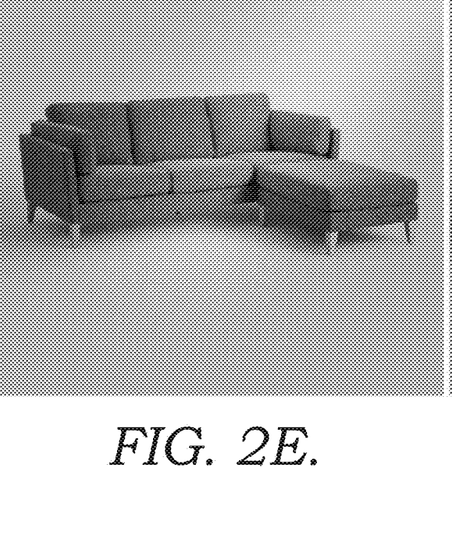
Figure 2F:
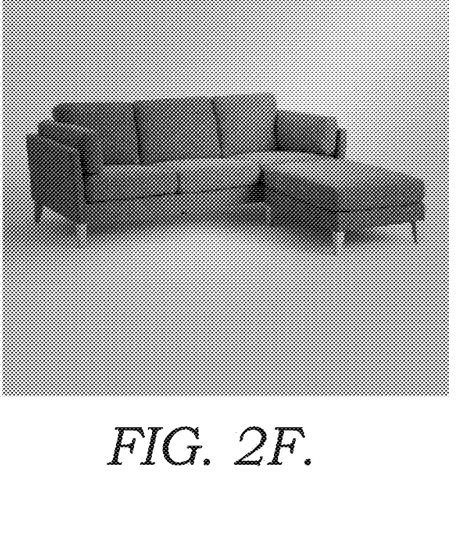

FIGS. 2A-2F and FIGS. 3A-3F provide examples of output images generated in accordance with the technology described herein. In the examples of FIGS. 2A-2F, an input image of couch has been provided to an image generation system, such as the image generation system 104 of FIG. 1. Based on the input image and specified lighting conditions, output images have been generated showing the couch under the different lighting conditions. In particular, FIG. 2A shows the couch during the daytime under neutral light, FIG. 2B shows the couch during the daytime under yellow light, FIG. 2C shows the couch during the daytime under white light, FIG. 2D shows the couch during the evening under neutral light, FIG. 2E shows the couch during the evening under yellow light, and FIG. 2F shows the couch during the evening under white light.

Figure 3A:
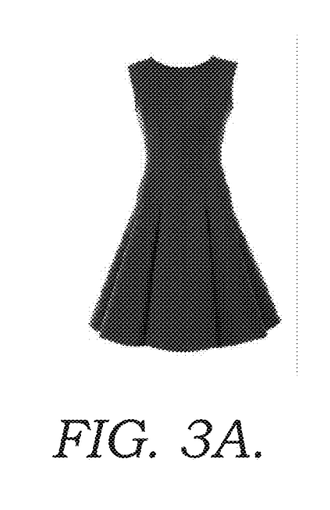
FIGS. 3A-F provide screenshots showing output images of a couch under different lighting conditions generated from an input image of the couch in accordance with some implementations of the present disclosure.
Figure 3B:
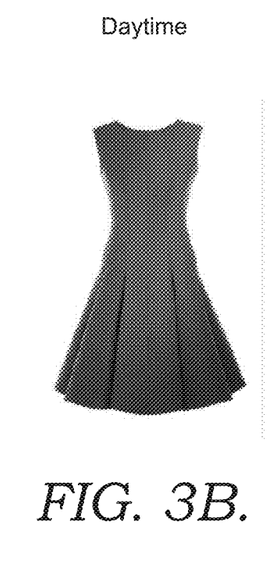
Figure 3C:
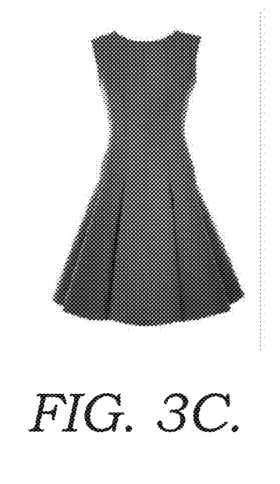
Figure 3D:
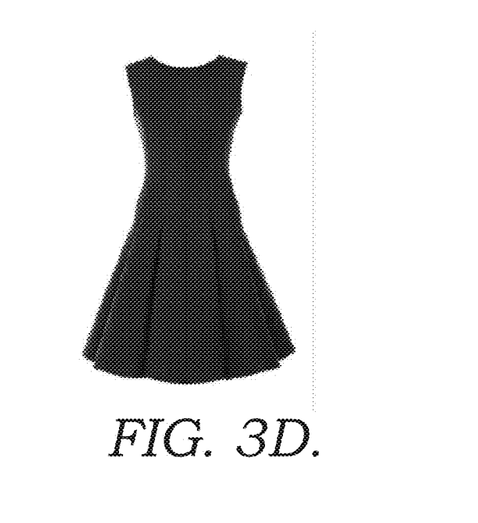
Figure 3E:
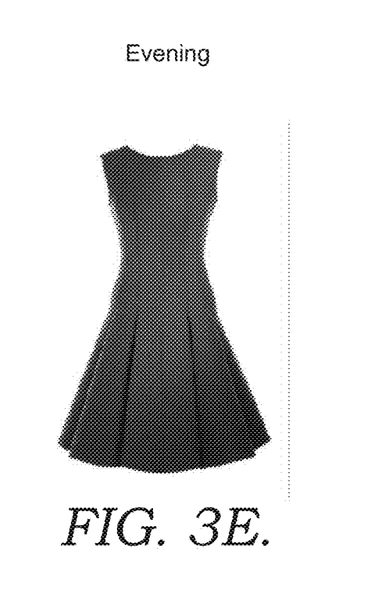
Figure 3F:
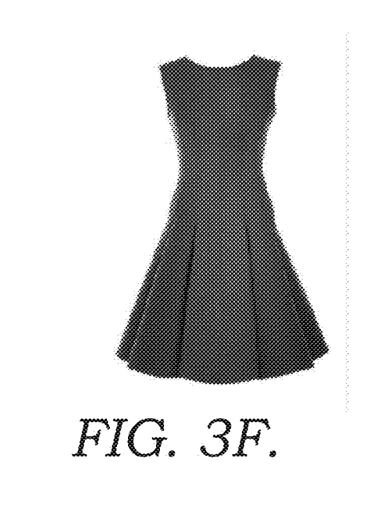

In the examples FIGS. 3A-3F, an input image of a dress has been has been provided to an image generation system, such as the image generation system 104 of FIG. 1. Based on the input image and specified lighting conditions, output images have been generated showing the dress under the different lighting conditions. In particular, FIG. 3A shows the dress during the daytime under neutral light, FIG. 2B shows the dress during the daytime under yellow light, FIG. 2C shows the dress during the daytime under white light, FIG. 2D shows the dress during the evening under neutral light, FIG. 2E shows the dress during the evening under yellow light, and FIG. 2F shows the dress during the evening under white light.

Figure 4:
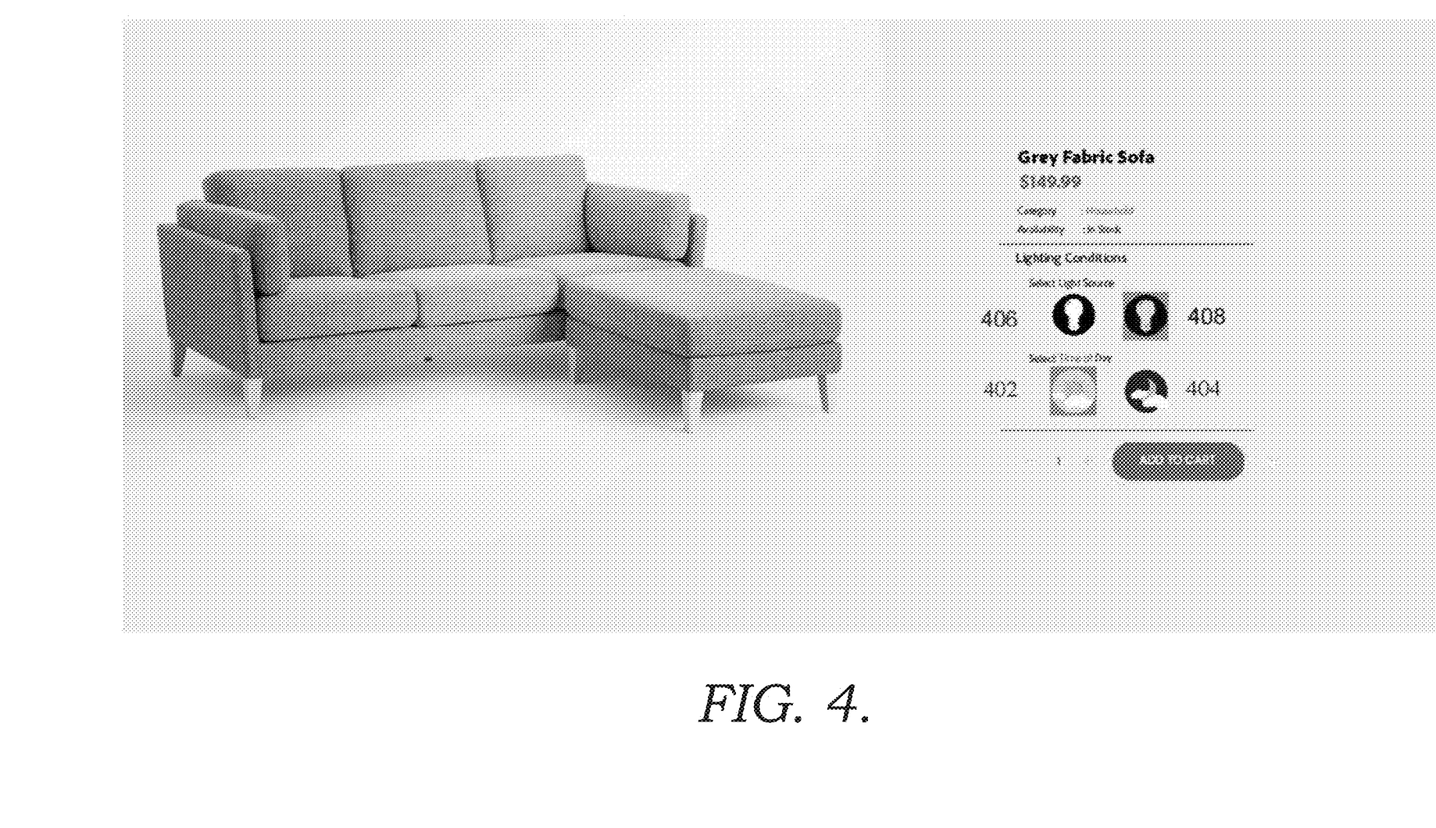
FIG. 4 is a screenshot of a user interface for selecting presentation of an object under different light conditions in accordance with some implementations of the present disclosure.

FIG. 4 provides an example of a webpage 400 allowing a customer to select to view a couch under different lighting conditions. As shown in FIG. 4, the webpage 400 includes user interface elements that allows a customer to select particular lighting conditions. In particular, user interface elements 402 and 404 allow a user to select light based on time of day, including daytime and evening, respectively. Additionally, user interface elements 406 and 408 allow a user to select yellow lighting or white lighting, respectively. In some cases, the images of the couch under the various lighting conditions provided by the webpage 400 may be pre-generated and stored, such that an image for a given lighting condition may simply be retrieved from storage and displayed when a customer selects a given lighting condition. In other cases, the images may be generated after the customer selects a given lighting condition. While the webpage 400 provides an example in which the customer can only select from certain light colors, a webpage in some configurations may provide the customer with more control over the lighting conditions. For instance, a user interface may be provided that allows a user to select a location of one or more light sources. For instance, a customer may plan to place a couch in between two end tables, each having a lamp. As such, the webpage may be configured to allow the customer to place a light source at each end of the couch. Additionally, the webpage may provide different user interface elements for allowing a user to select a color of a light source. For instance, a user interface element such as slider could be provided that allows a user to adjust a color temperature of the light source. Any and all such variations are contemplated to be within the scope of embodiments of the technology described herein.

Figure 5:
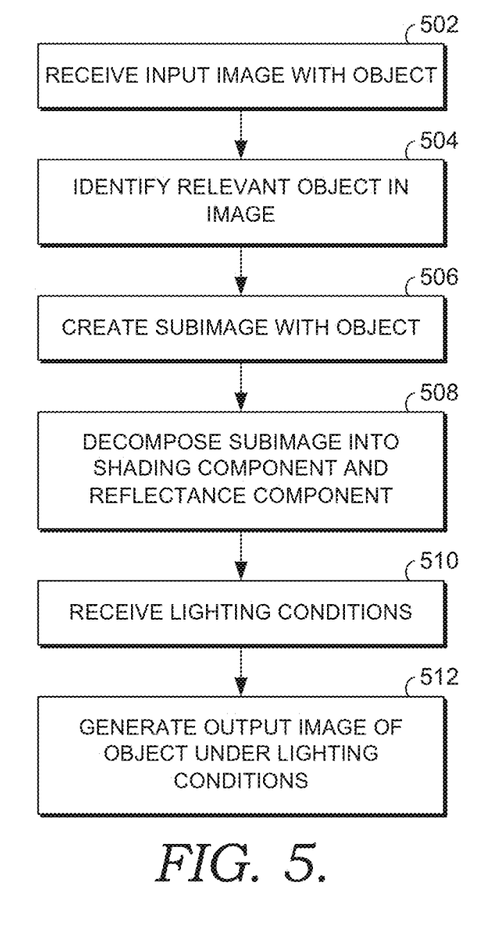
FIG. 5 is a flow diagram showing a method for generating an output image of an object under different light conditions given an input image of the object in accordance with some implementations of the present disclosure.

Example Methods for Generating an Object Image with Different Lighting Conditions With reference now to FIG. 5, a flow diagram is provided that illustrates a method 500 for generating an output image of an object under different lighting conditions given an input image of the object. The method 500 may be performed, for instance, by the image generation system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, an input image is received. The input image may include one or more objects. At least one relevant object is identified in the input image, as shown at block 504. In some cases, the input image may include a single object, which is identified. In other cases, the input image includes multiple objects. In such cases, each object in the image may be identified or a main object (e.g., an object centered in the image) may be identified. Identification of an object may include determining a bounding box around the object and/or determining of class for the object. For instance, an image may be received in which the object in the image is a couch. Based on the analysis at block 504, a bounding box around the couch in the image may be determined. Additionally, an object class of couch may be determined for the object.

A subimage containing the object is generated, as shown at block 506. The subimage comprises a portion of the image containing the object. In some configurations, the subimage is generated by creating a boundary mask for the object in the image.

As shown at block 508, the subimage is decomposed into a shading component and a reflectance component. While various techniques may be employed for decomposition of the subimage into a shading component and a reflectance component, one particular approach that may be employed is described in detail below with reference to FIG. 6.

Lighting conditions for generating an output image are received at block 510. The lighting conditions may specify, for instance, a location of a light source and/or a color of one or more light sources. The lighting conditions may be predetermined/default or the lighting conditions may be specified by a user.

As shown at block 512, an output image of the object under the lighting conditions is generated. In some configurations, the reflectance component and the lighting conditions are provided as input to a machine learning model, which generates the output image. A class determined for the object may also be provided as input to facilitate generation of the output image. For instance, the machine learning model may be trained on training images labeled with classes. Using the class of the object, the machine learning model may be able to generate an output image that better represents that properties of the object based on its class.

Figure 6:
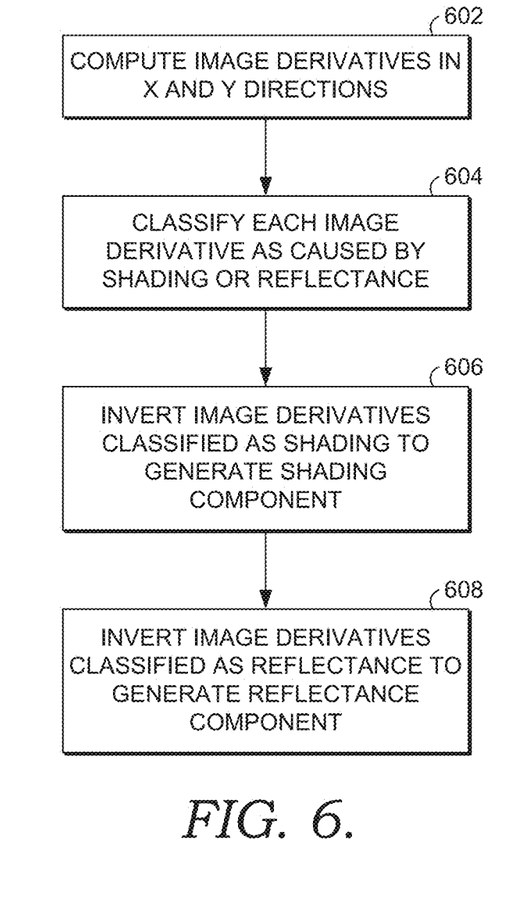
FIG. 6 is a flow diagram showing a method for decomposing an image in accordance with some implementations of the present disclosure.

Turning next to FIG. 6, a flow diagram is provided that illustrates a method 600 for decomposing an image. As shown at block 602, given an image (e.g., an input image or subimage from an input image), image derivatives in both the X and Y directions are computed for the image. Each image derivative is classified as caused by shading or reflectance, as shown at block 604. The image derivatives may be classified based on the differences in color channels for image derivatives. If an image derivative indicates that the differences in color channels are proportional to one another, the image derivative may be classified as shading. Otherwise, the image derivative is classified as reflectance.

A shading component for the image is generated, as shown at block 606. The shading component may be generated, for instance, by inverting the image derivatives classified as shading. Additionally, a reflectance component for the image is generated at block 608. The reflectance component may be generated, for instance, by inverting the image derivations classified as reflectance.

Exemplary Operating Environment

Figure 7:
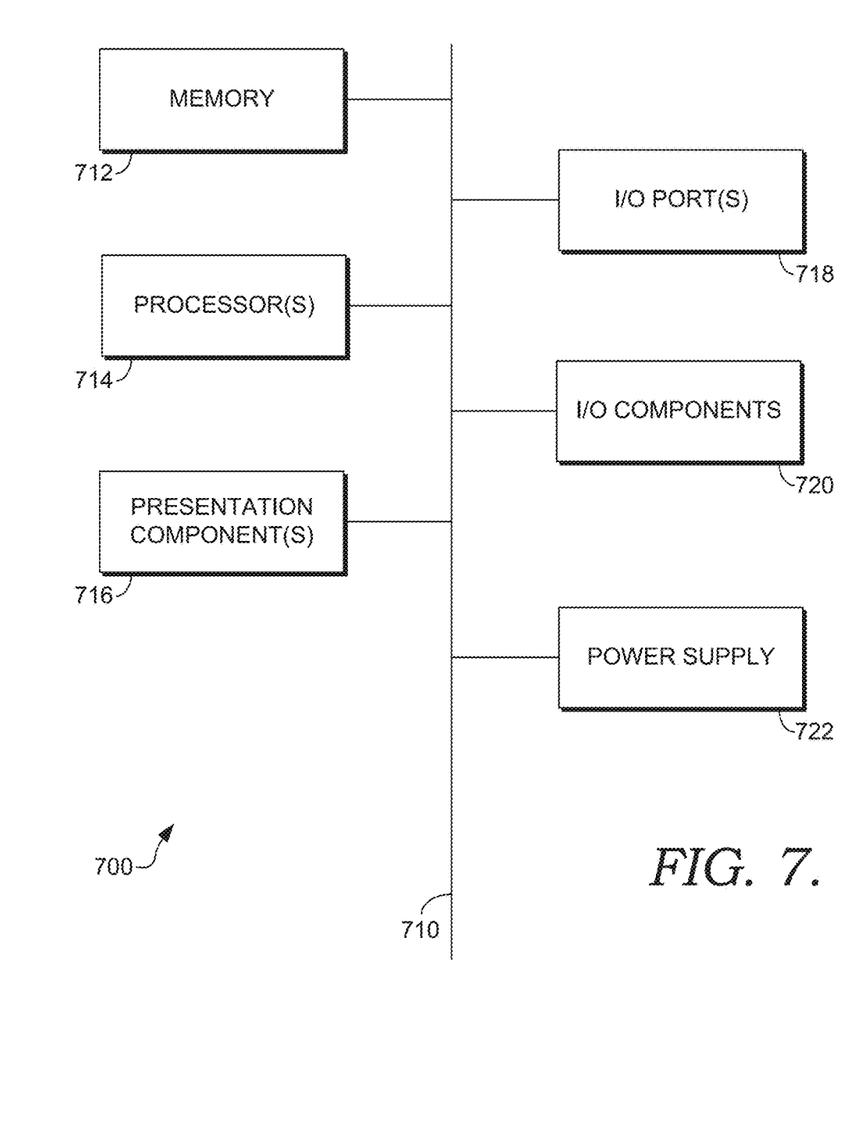
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

Aspects of the present invention have been described in relation to particular embodiments, which are intended in all respects to be illustrative rather than restrictive. Alternative embodiments will become apparent to those of ordinary skill in the art to which the present invention pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing instructions that, when used by one or more processors, cause the one or more processors to perform operations, the operations comprising:
   decomposing a color image of an object into a reflectance component and a shading component, the color image of the object captured under a first lighting condition;
   receiving, based on user input, an arbitrary lighting condition independent of the first lighting condition, the arbitrary light condition including a light source location and/or a light source color;
   generating, using a machine learning model, an output color image with the object under the arbitrary lighting condition using as input to the machine learning model: (1) the reflectance component, and (2) a second shading component based on with the light source location and/or the light source color; and
   providing the output color image with the object under the arbitrary lighting condition for display.

2. The computer storage media of claim 1, wherein the operations further comprise:
   processing the color image to identify the object in the image.

3. The computer storage media of claim 2, wherein processing the color image to identify the object comprises generating a bounding box around the object and a label identifying a class of the object.

4. The computer storage media of claim 1, wherein the operations further comprise:
   receiving an input image with the object; and
   generating a subimage of the input image, the subimage comprising a portion of the input image containing the object, wherein the color image of the object comprises the subimage.

5. The computer storage media of claim 4, wherein generating the subimage comprises generating a boundary mask segmenting the object from the color image.

6. The computer storage media of claim 1, wherein decomposing the color image into the reflectance component and the shading component comprises:
   computing image derivatives in X- and Y-directions;
   classifying each image derivative as caused by shading or reflectance;
   generating the shading component using the image derivatives classified as caused by shading; and
   generating the reflectance component using the image derivatives classified as caused by reflectance.

7. The computer storage media of claim 6, wherein an image derivative is classified as caused by shading if the image derivative indicates that differences in color channels between two adjacent pixels are proportionate.

8. The computer storage media of claim 1, wherein the machine learning model was trained to generate color images using training images with labels identifying object classes for objects in the training images, each object class identifying a type of object, and wherein the output color image is further generated by;
   identifying an object class of the object; and
   providing the object class of the object as input to the machine learning model for generating the output color image.

9. A computer-implemented method comprising:
   generating, by an image processing module, a subimage from an input color image of an object, the subimage comprising a portion of the input color image with the object, the input color image of the object captured under a first lighting condition;
   decomposing, by an image decomposition module, the subimage into a shading component and a reflectance component;
   generating, by an image generation component, an output color image with the object under an arbitrary lighting condition specified by a user independent of the first lighting condition, the output color image generated using a machine learning model that takes as input: (1) the reflectance component, and (2) a second shading component based on the arbitrary lighting condition; and
   providing the output color image with the object under the arbitrary lighting condition for display.

10. The computer-implemented method of claim 9, wherein the method further comprises:
    determining, by the image processing module, an object class of the object, the object class of the object identifying the object as a type of object.

11. The computer-implemented method of claim 10, wherein the machine learning model is trained to generate color images using training images of objects labeled with class information, the class information identifying a type of object for each of the objects in the training image, and wherein the object class of the object is provided as input to the machine learning model to generate the output color image.

12. The computer-implemented method of claim 9, wherein generating the subimage comprises generating a boundary mask segmenting the object from the input color image.

13. The computer-implemented method of claim 9, wherein decomposing the subimage into the reflectance component and the shading component comprises:
    computing image derivatives in X- and Y-directions;
    classifying each image derivative as caused by shading or reflectance;
    generating the shading component by inverting the image derivatives classified as caused by shading; and
    generating the reflectance component by inverting the image derivatives classified as caused by reflectance.

14. The computer-implemented method of claim 13, wherein an image derivative is classified as caused by shading if the image derivative indicates that differences in color channels between two adjacent pixels are proportionate.

15. The computer-implement method of claim 9, wherein the object comprises a product, and where the method further comprises providing the output color image for display on a webpage listing for the product.

16. A system comprising:
a computer storage media; and
a processing device, operatively coupled to the one or more computer storage media, to perform operations comprising:
processing, by an image processing module, an input color image of an object to identify an object class of the object and generating a subimage comprising a portion of the input color image with the object, the object class of the object identifying the object as a type of object, the input color image of the object captured under a first lighting condition;
decomposing, by an image decomposition module, the subimage into a shading component and a reflectance component;
generating, by an image generation component, an output color image with the object under an arbitrary lighting condition specified by a user independent of the first lighting condition, the arbitrary light condition, the output color image generated using a machine learning model that takes as input: (1) the reflectance component, (2) a second shading component based on the arbitrary lighting condition, and (3) the object class; and
providing the output color image with the object under the arbitrary lighting condition for display.

17. The system of claim 16, wherein the machine learning model is trained to generate color images using training images of objects labeled with class information, the class information identifying a type of object for each of the objects in the training images.

18. The system of claim 16, wherein the subimage is generated by creating a boundary mask segmenting the object from the input color image.

19. The system of claim 16, wherein decomposing the subimage into the reflectance component and the shading component comprises:
computing image derivatives in X- and Y-directions;
classifying each image derivative as caused by shading or reflectance;
generating the shading component by inverting the image derivatives classified as caused by shading; and
generating the reflectance component by inverting the image derivatives classified as caused by reflectance.

20. The system of claim 19, wherein an image derivative is classified as caused by shading if the image derivative indicates that differences in color channels between two adjacent pixels are proportionate.

* * * * *